United States Patent
Wang et al.

(10) Patent No.: US 8,717,926 B2
(45) Date of Patent: May 6, 2014

(54) METHOD AND DEVICE FOR SWITCHING FROM DUAL STREAM TO SINGLE STREAM IN UPLINK MIMO MODE

(75) Inventors: Zongjie Wang, Shanghai (CN); Xueli Ma, Shanghai (CN); Jing Li, Shanghai (CN); Chongyang Han, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 285 days.

(21) Appl. No.: 13/350,358

(22) Filed: Jan. 13, 2012

(65) Prior Publication Data

US 2012/0120895 A1    May 17, 2012

Related U.S. Application Data

(63) Continuation of application No. PCT/CN2010/074893, filed on Jul. 1, 2010.

(30) Foreign Application Priority Data

Jul. 15, 2009    (CN) .......................... 2009 1 0151997

(51) Int. Cl.
*G01R 31/08*    (2006.01)

(52) U.S. Cl.
USPC .......................................... 370/252; 455/450

(58) Field of Classification Search
USPC ........................ 370/252–465; 455/450–522
See application file for complete search history.

(56) References Cited

U.S. PATENT DOCUMENTS

| 2003/0109257 A1 | 6/2003 | Nilsson et al. |
| 2009/0097586 A1 | 4/2009 | Ko et al. |
| 2009/0227209 A1 * | 9/2009 | Craig et al. ................ 455/67.13 |
| 2010/0130219 A1 * | 5/2010 | Cave et al. ..................... 455/450 |
| 2012/0002624 A1 * | 1/2012 | Li et al. ......................... 370/329 |

FOREIGN PATENT DOCUMENTS

| CN | 1735273 A | 2/2006 |
| CN | 101102141 A | 1/2008 |
| CN | 101262310 A | 9/2008 |
| CN | 101359953 A | 2/2009 |
| CN | 101365229 A | 2/2009 |
| CN | 101426229 A | 5/2009 |
| EP | 2426846 A1 | 3/2012 |
| WO | WO 2006123418 A1 | 11/2006 |
| WO | WO 2009018698 | 2/2009 |

OTHER PUBLICATIONS

International Search Report in corresponding PCT Application No. PCT/CN2010/074893 (Oct. 21, 2010).

(Continued)

*Primary Examiner* — Ricky Ngo
*Assistant Examiner* — Iqbal Zaidi
(74) *Attorney, Agent, or Firm* — Leydig, Voit & Mayer, Ltd.

(57) ABSTRACT

Embodiments of the present disclosure provide a method for switching from a dual stream to a single stream in an uplink MIMO mode. The method includes: sending a scheduling command with a value of absolute grant being zero_grant to a secondary data stream; and after a preset time since the scheduling command takes effect, sending a switching command that instructs a terminal to switch from an uplink MIMO dual stream to an uplink MIMO single stream. Hence, the embodiments of the present disclosure help to reduce data loss, and meanwhile, to simplify the HARQ design for switching from an uplink MIMO dual stream to an uplink MIMO single stream.

11 Claims, 3 Drawing Sheets

(56) References Cited

OTHER PUBLICATIONS

Written Opinion of the International Searching Authority in corresponding PCT Application No. PCT/CN2010/074893 (Oct. 21, 2010).

"R2-063374—Impact of MIMO on MAC Specification," 3GPP TSG-RAN WG2 Meeting #56, Nov. 6-10, 2006, 3GPP, Valbonne, France.

Extended European Search Report in corresponding European Patent Application No. 10799424.6 (Jan. 28, 2013).

* cited by examiner

METHOD AND DEVICE FOR SWITCHING FROM DUAL STREAM TO SINGLE STREAM IN UPLINK MIMO MODE

CROSS-REFERENCE TO RELATED APPLICATIONS

This application is a continuation of International Application No. PCT/CN2010/074893, filed on Jul. 1, 2010, which claims priority to Chinese Patent Application No. 200910151997.X, filed on Jul. 15, 2009, both of which are hereby incorporated by reference in their entireties.

FIELD OF THE INVENTION

The present invention relates to the field of communications technologies, and in particular, to a method and device for switching from a dual stream to a single stream in an MIMO mode.

BACKGROUND OF THE INVENTION

With the rapid development of communications technologies, wideband code division multiple access (Wideband Code Division Multiple Access, WCDMA), as one of the main technologies in the 3rd generation mobile communication system, is widely researched and applied worldwide. In a current WCDMA system, a single antenna is used for uplink transmission. In order to further improve an uplink transmission rate of the WCDMA system, and shorten a data transmission delay, a multi-antenna technology is required in the uplink to bear data.

FIG. 1 is a schematic diagram of a principle of downlink MIMO (Multiple Input Multiple Output, multiple input multiple output) in the prior art. As shown in FIG. 1, W1, W2, W3, and W4 are called weighting factors of data blocks (Blocks), where $$W1 = \frac{1}{\sqrt{2}}$$

and W2 is precoding information that is fed back by a user equipment (User Equipment, UE) to a Node B (Node B). The value of W2 may be selected from the following set, for example, $$w_2 \in \left\{ \frac{1+j}{2} \quad \frac{1-j}{2} \quad \frac{-1+j}{2} \quad \frac{-1-j}{2} \right\}.$$

(W1, W2) is called a primary precoding vector that is used to perform weighting on primary data blocks, while W3=W1, and W4=−W2. (W3, W4) is called a secondary precoding vector that is used to perform weighting on secondary data blocks.

A MIMO dual stream refers to two different data blocks scheduled by the Node B each time, where one is a primary data block and the other is a secondary data block. A MIMO single stream refers to a single data block scheduled by the Node B each time. A data stream corresponding to a primary data block is a primary data stream, and a data stream corresponding to a secondary data block is a secondary data stream. In the prior art, the Node B may schedule a downlink MIMO dual stream, or may schedule a downlink MIMO single stream. Switching between the downlink MIMO single stream and the downlink MIMO dual stream is controlled by the Node B. For example, the Node B decides whether to schedule the downlink MIMO dual stream or the downlink MIMO single stream at a next time according to the channel quality and precoding control indication fed back by the UE and in combination with the actual condition of the Node B. In the prior art, since the uplink MIMO technology is still under research, no relevant solutions are available currently to switching from a dual stream to a single stream in an uplink MIMO mode.

SUMMARY OF THE INVENTION

Embodiments of the present invention provide a method and device for switching from a dual stream to a single stream in an uplink MIMO mode, so as to implement the switching from a dual stream to a single stream in an uplink MIMO mode.

In one aspect, an embodiment of the present invention provides a method for switching from a dual stream to a single stream in an uplink MIMO mode. The method includes: sending a scheduling command with a value of absolute grant being zero_grant to a secondary data stream; and after a preset time since the scheduling command takes effect, sending a switching command that instructs a terminal to switch from an uplink MIMO dual stream to an uplink MIMO single stream.

In another aspect, an embodiment of the present invention provides a Node B. The Node B includes: a scheduling command sending unit, configured to send a scheduling command with a value of absolute grant being zero_grant to a secondary data stream; and a switching command sending unit, configured to, after a preset time since the scheduling command takes effect, send a switching command that instructs a terminal to switch from an uplink MIMO dual stream to an uplink MIMO single stream.

In still another aspect, an embodiment of the present invention provides a method for switching from a dual stream to a single stream in an uplink MIMO mode. The method includes: receiving a switching command for switching from an uplink MIMO dual stream to an uplink MIMO single stream; before the received switching command takes effect, stopping sending new data in a secondary data stream, and only retransmitting the data to be retransmitted in the secondary data stream; and when the switching command takes effect, switching from the uplink MIMO dual stream to the uplink MIMO single stream.

In yet another aspect, an embodiment of the present invention provides a communication terminal. The communication terminal includes: a receiving unit, configured to receive a switching command for switching from an uplink MIMO dual stream to an uplink MIMO single stream; a responding unit, configured to, before the received switching command takes effect, stop sending new data in a secondary data stream and retransmit the data to be retransmitted in the secondary data stream; and a switching unit, configured to, when the switching command takes effect, switch from the uplink MIMO dual stream to the uplink MIMO single stream.

In a method for switching from a dual stream to a single stream in an uplink MIMO mode according to an embodiment of the present invention, the scheduling command is sent first to control the communication terminal to stop sending new data in the secondary data stream and only retransmit the data; and then the switching command is sent a period of time later. In this way, when the communication terminal switches from the uplink MIMO dual stream to the uplink MIMO single stream, no or only a relatively small amount of data to be retransmitted exists in the secondary data stream, which helps to reduce data loss, and meanwhile, to simplify the HARQ (Hybrid Automatic Repeat request, hybrid automatic repeat request) design.

The Node B in the embodiment of the present invention forcedly controls the communication terminal to stop sending new data in the secondary data stream by sending a scheduling command, and the Node B is only allowed to retransmit the data to be retransmitted in the secondary data stream, and sends the switching command a period of time later. Therefore, the Node B in the embodiment of the present invention may control the switching time, so as to ensure that no or only a relatively small amount of data to be retransmitted exists in the secondary data stream when the switching occurs, which reduces data loss and simplifies the HARQ design.

In another method for switching from a dual stream to a single stream in an uplink MIMO mode according to an embodiment of the present invention, sending new data in the secondary data stream is stopped after receiving a switching command and before the switching command takes effect; and only the data is retransmitted. In this way, when the switching command takes effect, no or only a relatively small amount of data to be retransmitted exists in the secondary data stream, which helps to reduce data loss and simplify the HARQ design.

The communication terminal according to an embodiment of the present invention actively stops sending new data after receiving the switching command sent by the Node B and before the switching command takes effect; and only retransmits the data. In this way, when the switching command takes effect, no or only a relatively small amount of data to be retransmitted exists in the secondary data stream, which helps to reduce data loss and simplify the HARQ design.

DETAILED DESCRIPTION OF THE EMBODIMENTS

Figure 1:
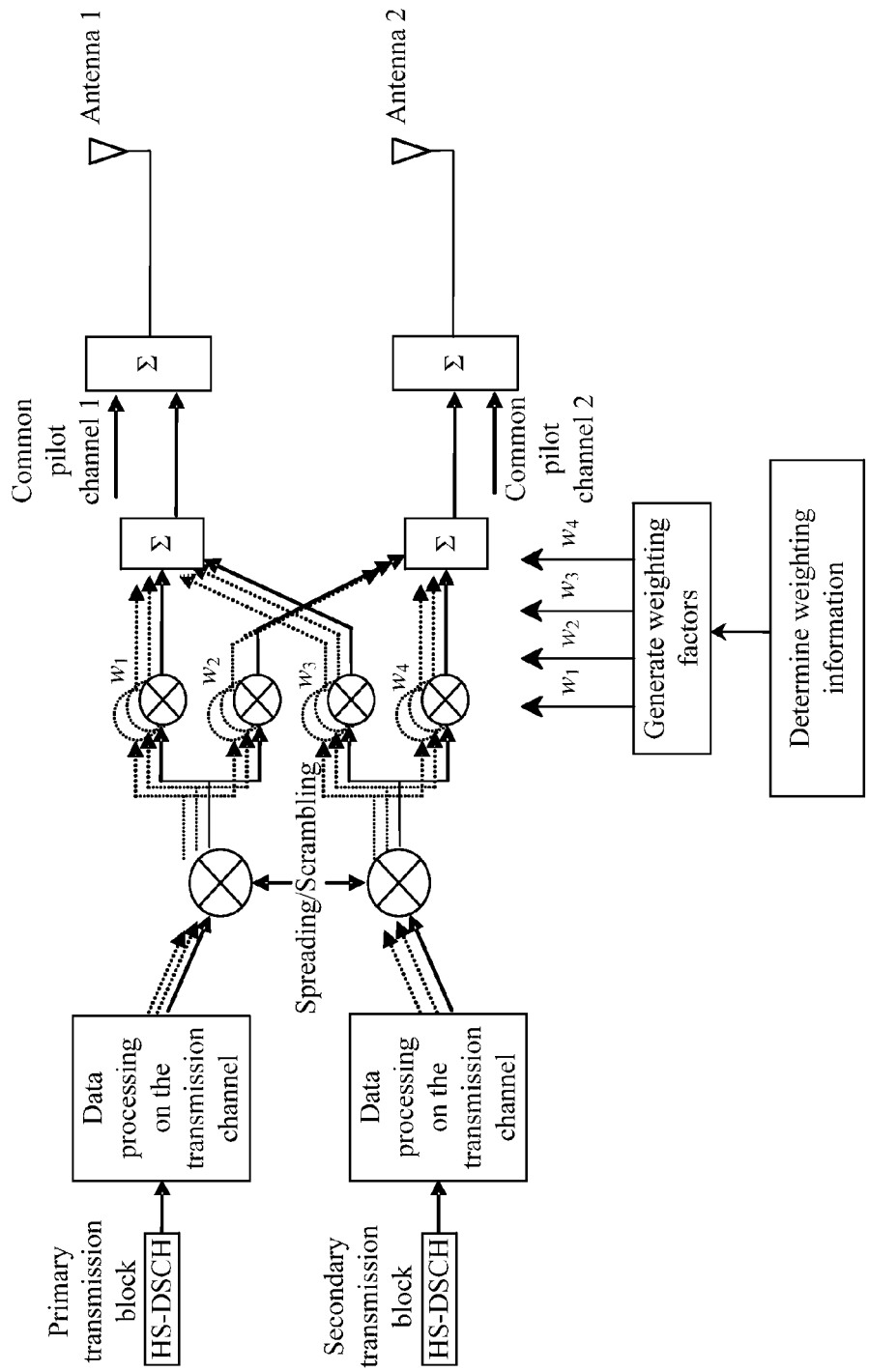
FIG. 1 is a schematic diagram of a principle of downlink MIMO in the prior art.

Embodiments of the present invention build an uplink MIMO architecture by referring to the downlink MIMO architecture in the prior art. The principle diagram of the uplink MIMO is similar to FIG. 1. After the MIMO technology is introduced into the uplink, switching between the uplink MIMO singe stream and the uplink MIMO dual stream needs to be considered. For example, in a scenario that the volume of the data that the UE needs to transmit is relatively small, or the power of the UE is limited, the UE needs to transmit data by using the MIMO single stream; and under a situation that the volume of the data to be transmitted is relatively large, the UE needs to transmit data by using the MIMO dual stream.

Referring to the principle of the downlink MIMO technology, switching between the uplink MIMO single stream and the uplink MIMO dual stream according to embodiments of the present invention is also performed under the control of the Node B. When the switching command delivered by the Node B for switching from a dual stream to a single stream takes effect, there might be a relatively large amount of data in the secondary data stream of the UE needing to be retransmitted. At this time, in order to avoid data loss, a HARQ (Hybrid Automatic Retransmission reQuest, hybrid automatic retransmission request) design is required for the data to be retransmitted in the secondary data stream, which may greatly increases complexity of the implementation. If the HARQ design is not performed for the secondary data stream, the implementation is relatively simple but packet loss may occur. Therefore, in order to simplify the HARQ design and reduce data loss, a solution to switching from a dual stream to a single stream in an uplink MIMO mode needs to be designed.

In conclusion, in an uplink MIMO mode, when the switching from a dual stream to a single stream occurs, and the UE inevitably needs to retransmit a large amount of data in the secondary data stream, a large amount of data is lost or the HARQ design is too complicated. Embodiments of the present invention put forward a method and device for switching from a dual stream to a single stream in an uplink MIMO mode to solve the above-mentioned problem during switching between the single stream and the dual stream in an uplink MIMO mode.

In order to make the objectives, the technical solutions and the merits of the embodiments of the present invention clearer, the technical solutions in the embodiments of the present invention are fully and completely described with reference to the accompanying drawings. Evidently, the embodiments to be described are a part rather than all of the embodiments of the present invention. All other embodiments obtained by persons of ordinary skill in the art based on the embodiments of the present invention without creative efforts shall fall within protection scope of the present invention.

An embodiment of the present invention provides a method for switching from a dual stream to a single stream in an uplink MIMO mode. A purpose of reducing data loss and simplifying the HARQ design is achieved by selecting a proper switching time.

Figure 2:
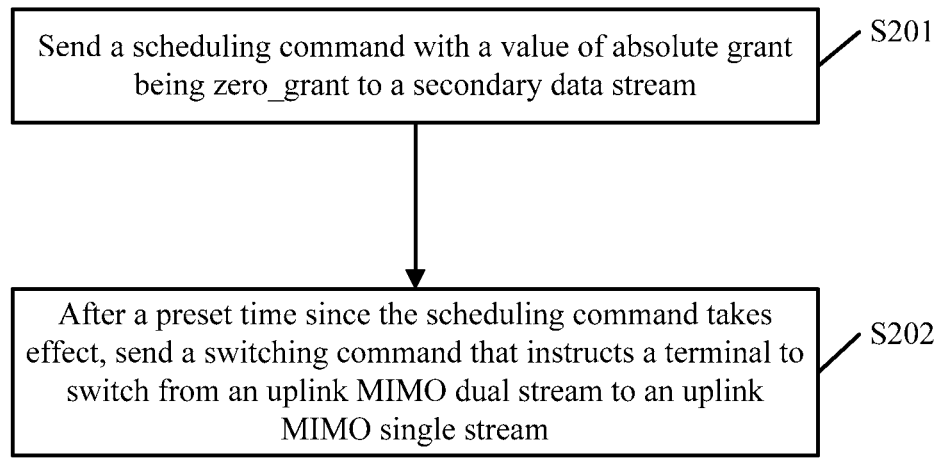
FIG. 2 is a flow chart of a method for switching from a dual stream to a single stream in an uplink MIMO mode according to an embodiment of the present invention.

FIG. 2 is a flow chart of a method for switching from a dual stream to a single stream in an uplink MIMO mode according to an embodiment of the present invention. As shown in FIG. 2, the switching method includes the following steps:

Step S201: Send a scheduling command with a value of absolute grant being zero_grant to a secondary data stream.

The absolute grant (AG, Absolute Grant) information is the scheduling information sent by a Node B to a UE. The scheduling information indicates how much power the UE uses to transmit new data. Values of different AGs correspond to different E-TFC selections, that is, different sizes of data blocks to be sent. E-TFC means E-DCH transport format combination (E-DCH Transport Format Combination), where E-DCH means enhanced dedicated transport channel (Enhanced Dedicated Transport Channel). If AG=zero_grant (zero grant), the UE cannot select an E-TFC for the scheduling service and cannot transmit new data. Data retransmission requires no E-TFC selection, and therefore when AG=zero_grant, that the UE retransmits data is not affected. In this embodiment, the value of the AG information sent by the Node B to the secondary data stream of the UE is zero grant zero_grant. After receiving the scheduling command with a value of absolute grant being zero_grant, the UE stops sending new data in the secondary data stream, and only retransmits the data to be retransmitted in the secondary data stream.

Step S202: After a preset time since the scheduling command takes effect, send a switching command that instructs the UE to switch from an uplink MIMO dual stream to an uplink MIMO single stream.

The preset time N may be set at the network side according to different policies. For example, if part of data can only be retransmitted once, 0≤N<9 timeslots; if all data can be retransmitted at least once, N≥9 timeslots.

The command for switching from an uplink MIMO dual stream to an uplink MIMO single stream may be a high-speed shared control channel (HS-SCCH, Shared Control Channel for HS-DSCH) command. For example, values 0 or 1 of this command may respectively indicate switching from a dual stream to a single stream or switching from a single stream to a dual stream. That is, when the value of the command received by the UE is 0, it means switching from the uplink MIMO dual stream to the uplink MIMO single stream.

Optionally, in a specific implementation, step S203 may further be included after step S202.

Step S203: When the UE switches from an uplink MIMO dual stream to an uplink MIMO single stream, if data to be retransmitted still exists in the secondary data stream, discard the data.

In the method for switching from a dual stream to a single stream in an uplink MIMO mode according to the embodiment shown in FIG. 2, the scheduling command is sent first to control the UE to stop sending new data in the secondary stream, and only retransmit the data to be retransmitted; and then the switching command is sent a period of time later. In this way, when the UE switches from the uplink MIMO dual stream to the uplink MIMO single stream, no data or only a small amount of data exists in the secondary stream, which helps to reduce data loss and simplify the HARQ (Hybrid Automatic Retransmission reQuest, hybrid automatic retransmission request) design.

An embodiment of the present invention further provides a Node B. The Node B, before sending a command for switching from an uplink MIMO dual stream to an uplink MIMO single stream, sends a scheduling command first to instruct a UE to stop sending new data in a secondary data stream and only retransmit the data in the secondary data stream, which enables the switching time to be more reasonable, that is, data loss is reduced during switching.

Figure 3:
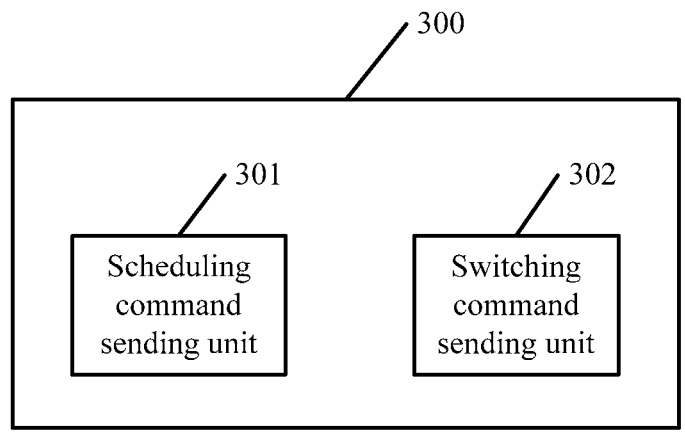
FIG. 3 is a functional block diagram of a Node B according to an embodiment of the present invention.

FIG. 3 is a functional block diagram of a Node B according to an embodiment of the present invention. As shown in FIG. 3, a Node B provided by an embodiment of the present invention includes the following.

A scheduling command sending unit 301 is configured to send a scheduling command with a value of absolute grant being zero_grant to a secondary data stream. The absolute grant (AG, Absolute Grant) information is the scheduling information sent by the Node B to a UE. The scheduling information indicates how much power the UE uses to send new data. Values of different AGs correspond to different E-TFC selections, that is, different sizes of data blocks to be transmitted. If AG=Zero_Grant (zero grant), the UE cannot select an E-TFC for the scheduling service and cannot transmit new data. Data retransmission requires no E-TFC selection, and therefore when AG=zero_grant, that the UE retransmits data is not affected. In this embodiment, the value of the AG information sent by the Node B to the UE is zero grant zero_grant. After receiving the scheduling command with a value of absolute grant being zero_grant, the UE stops sending new data in the secondary data stream, and only retransmits the data to be retransmitted in the secondary data stream.

The switching command sending unit 302 is configured to send a switching command after a preset time since the scheduling command takes effect, where the switching command instructs the UE to switch from an uplink MIMO dual stream to an uplink MIMO single stream. The preset time N may be set at the network side according to different policies. For example, if part of data can only be retransmitted once, 0≤N<9 timeslots; if all data can be retransmitted at least once, N≥9 timeslots.

The command for switching from an uplink MIMO dual stream to an uplink MIMO single stream may be a downlink high-speed shared control channel (HS-SCCH, Shared Control Channel for HS-DSCH) command. The UE switches from the uplink MIMO dual stream to the uplink MIMO single stream according to the switching command. When the UE switches from an uplink MIMO dual stream to an uplink MIMO single stream, if data to be retransmitted still exists in the secondary data stream, the data is discarded.

The Node B in the embodiment of the present invention as shown in FIG. 3 controls the UE to stop sending new data in the secondary data stream by sending a scheduling command, and the Node B is only allowed to retransmit the data to be retransmitted in the secondary data stream, and sends the switching command a period of time later. Therefore, the Node B in the embodiment of the present invention may control the switching time, so as to ensure that no or only a relatively small amount of data to be retransmitted exists in the secondary data stream when the switching occurs, which reduces data loss and simplifies the HARQ design.

An embodiment of the present invention further provides another method for switching from a dual stream to a single stream in an uplink MIMO mode. In this method, before the received command for switching from a dual stream to a single stream in an uplink MIMO mode takes effect, the UE stops sending new data in the secondary data stream, and only retransmits the data. Therefore, when the UE switches from the uplink MIMO dual stream to the uplink MIMO single stream, no or only a relatively small amount of data to be retransmitted exists in the secondary data stream.

Figure 4:
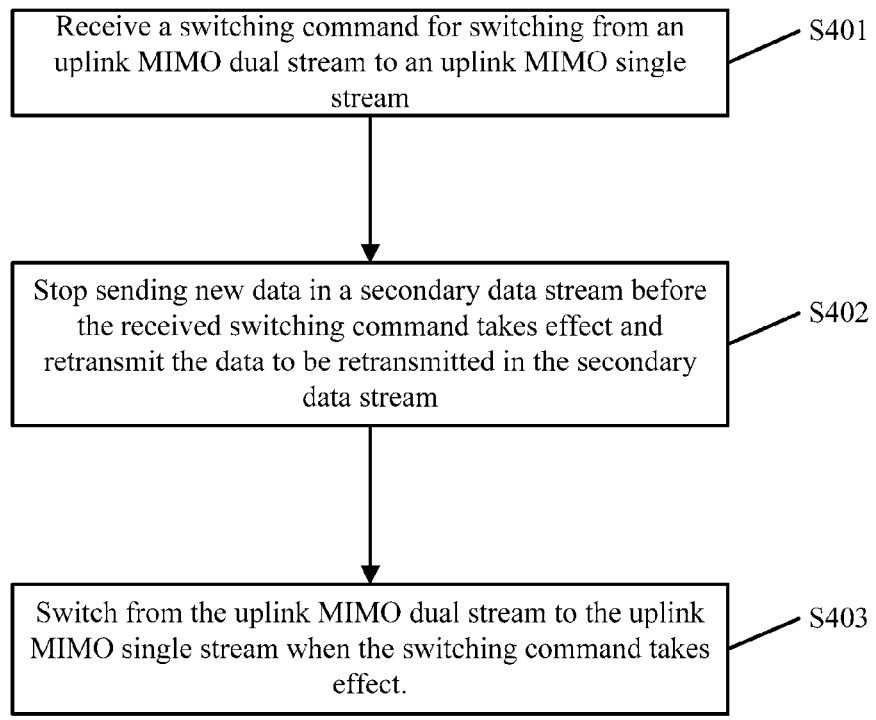
FIG. 4 is a flow chart of a method for switching from a dual stream to a single stream in another uplink MIMO mode according to an embodiment of the present invention.

FIG. 4 is a flow chart of a method for switching from a dual stream to a single stream in an uplink MIMO mode according to an embodiment of the present invention. As shown in FIG. 4, the switching method includes the following steps:

Step S401: Receive a command for switching from an uplink MIMO dual stream to an uplink MIMO single stream, where the command for switching from an uplink MIMO dual stream to an uplink MIMO single stream may be a downlink high-speed shared control channel (HS-SCCH, Shared Control Channel for HS-DSCH) command.

Step S402: Before the switching command takes effects, stop sending new data in a secondary data stream, and retransmit the data to be retransmitted in the secondary data stream. The switching command takes effect after 12 timeslots since a Node B sends the HS-SCCH command.

Step S403: Switch from the uplink MIMO dual stream to the uplink MIMO single stream when the switching command takes effect.

Optionally, in a specific application, the method may further include step S404.

Step S404: Discard the data if the secondary data stream includes data to be retransmitted, when the switching command takes effect, that is, when the UE switches from the uplink MIMO dual stream to the uplink MIMO single stream.

In a method for switching from a dual stream to a single stream in an uplink MIMO mode according to the embodiment shown in FIG. 4, sending new data in the secondary stream is stopped before the received switching command takes effect; and only the data to be retransmitted is retransmitted. In this way, when the switching command takes effect, no data or only a relatively small amount of data to be retransmitted in the secondary stream, which reduces data loss and simplifies the HARQ design.

An embodiment of the present invention further provides a communication terminal, for example, a UE. The communication terminal, after receiving a command sent by the Node B for switching from a MIMO dual stream to a MIMO single stream and before this command takes effect, stops sending new data in a secondary data stream, and only retransmits data. Therefore, when the terminal switches from the uplink MIMO dual stream to the uplink MIMO single stream, no or only a relatively small amount of data exists in the secondary data stream.

Figure 5:
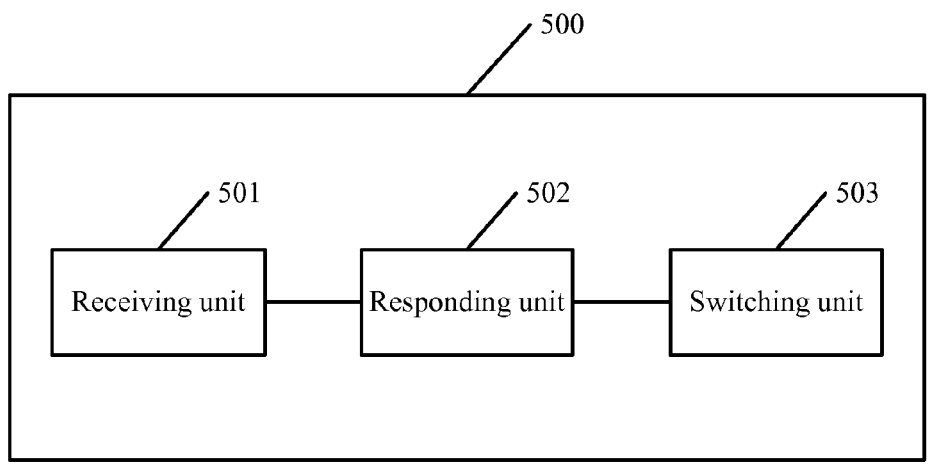
FIG. 5 is a functional block diagram of a communication terminal according to an embodiment of the present invention.

FIG. 5 is a functional block diagram of a communication terminal according to an embodiment of the present invention. As shown in FIG. 5, the communication terminal 500 includes:

a receiving unit 501, configured to receive a command for switching from an uplink MIMO dual stream to an uplink MIMO single stream, where the command for switching from an uplink MIMO dual stream to an uplink MIMO single stream may be a downlink high-speed shared control channel (HS-SCCH, Shared Control Channel for HS-DSCH) command;

a responding unit 502, configured to, before the switching command takes effect, stop sending new data in a secondary data stream and retransmit the data to be retransmitted in the secondary data stream, where the switching command takes effect after 12 timeslots since a Node B sends an HS-SCCH order; and a switching unit 503, configured to switch from the uplink MIMO dual stream to the uplink MIMO single stream when the switching command takes effect.

Optionally, in different applications, when the switching command takes effect, if data to be retransmitted still exists in the secondary data stream, the data is discarded.

The communication terminal according to the embodiment shown in FIG. 5, after receiving the switching command sent by the Node B, stops sending new data before the switching command takes effect, and only retransmits the data. In this way, when the switching command takes effect, no data or only a relatively small amount of data to be retransmitted exists in the secondary data stream, which avoids the switching from an uplink MIMO dual stream to an uplink MIMO single stream when a relatively large amount of data to be retransmitted exists in the secondary data stream, and thereby helping to reduce data loss and simplify the HARQ design.

It may be understood by persons of ordinary skill in the art that, all or part of the steps of the methods according to the embodiments of the present invention may be implemented by a program instructing relevant hardware. The program may be stored in a computer readable storage medium. When the program runs, the procedures of the methods according to the embodiments are performed. The storage medium may be a magnetic disk, an optical disk, a read-only memory (Read-Only Memory, ROM), or a random access memory (Random Access Memory, RAM).

The above embodiments are merely used for illustrating the technical solutions of the embodiments of the present invention, and the technical solutions are not limited thereto. It should be understood by persons of ordinary skill in the art that: although the embodiments of the present invention have been described in detail by referring to the forgoing embodiments, modifications still may be made to the technical solutions described in the embodiments, or equivalent replacements may be made to some technical features thereof, and these modifications or replacements do not cause the essence of the corresponding technical solutions to depart from the scope of the technical solutions of the embodiments of the present invention.

What is claimed is:

1. A method for switching from a dual stream to a single stream in an uplink multiple input multiple output (MIMO) mode, the method comprising:
    sending a scheduling command with a value of absolute grant being zero_grant to a secondary data stream; and
    sending, a preset time after the scheduling command takes effect, a switching command that instructs a terminal to switch from an uplink MIMO dual stream to an uplink MIMO single stream,
    wherein when part of data in the secondary data stream needs to be retransmitted once the preset time is shorter than nine timeslots; and
    wherein when all of data in the secondary data needs to be retransmitted at least once, the preset time is longer than or equal to nine timeslots.

2. The method according to claim 1, wherein:
    the switching command that instructs the terminal to switch from the uplink MIMO dual stream to the uplink MIMO single stream is a downlink high-speed shared control channel command.

3. The method according to claim 1, comprising:
    when the terminal switches from the uplink MIMO dual stream to the uplink MIMO single stream and data to be retransmitted still exists in the secondary data stream, discarding the data to be retransmitted.

4. A Node B, comprising:
    a scheduling command sending unit, configured to send a scheduling command with a value of absolute grant being zero_grant to a secondary data stream; and
    a switching command sending unit, configured to, a preset time after the scheduling command takes effect, send a switching command that instructs a terminal to switch from an uplink multiple input multiple output (MIMO) dual stream to an uplink MIMO single stream,
    wherein when part of data in the secondary data stream needs to be retransmitted, the preset time is shorter than nine timeslots, and
    wherein when all data in the secondary data stream needs to be retransmitted at least once, the preset time is longer than or equal to nine timeslots.

5. The Node B according to claim 4, wherein:
    the switching command that instructs the terminal to switch from the uplink MIMO dual stream to the uplink MIMO single stream is a downlink high-speed shared control channel command.

6. A method for switching from a dual stream to a single stream in an uplink multiple input multiple output (MIMO) mode, the method comprising:
    receiving a command for switching from an uplink MIMO dual stream to an uplink MIMO single stream;
    before the received switching command takes effect, stopping sending new data in a secondary data stream, and retransmitting data to be retransmitted in the secondary data stream; and
    when the switching command takes effect, switching from the uplink MIMO dual stream to the uplink MIMO single stream, wherein when data to be retransmitted still exists in the secondary data stream when the switching command takes effect, the data to be retransmitted is discarded.

7. The method according to claim 6, wherein:
the switching command is a downlink high-speed shared control channel command.

8. The method according to claim 6, wherein:
the switching command takes effect 12 timeslots after a Node B sends the switching command.

9. A communication terminal, comprising:
a receiving unit, configured to receive a command for switching from an uplink multiple input multiple output (MIMO) dual stream to an uplink MIMO single stream;
a responding unit, configured to, before the received switching command takes effect, stop sending new data in a secondary data stream, and retransmit data to be retransmitted in the secondary data stream; and
a switching unit, configured to, when the switching command takes effect, switch from the uplink MIMO dual stream to the uplink MIMO single stream, wherein when data to be retransmitted still exists in the secondary data stream when the switching command takes effect, the data to be retransmitted is discarded.

10. The communication terminal according to claim 9, wherein:
the switching command is a downlink high-speed shared control channel command.

11. The communication terminal according to claim 9, wherein:
the switching command takes effect 12 timeslots after a Node B sends the switching command.

\* \* \* \* \*